United States Patent [19]
Tomita et al.

[11] Patent Number: 5,626,703
[45] Date of Patent: May 6, 1997

[54] METHOD FOR PREPARING A LIQUID CRYSTAL RESIN COMPOSITE MATERIAL AND MOLDING A PRODUCT FROM THE SAME

[75] Inventors: Takashi Tomita, Hiroshima; Masakatsu Ohsugi, Hiroshima-ken; Yushi Matsuda, Hiroshima; Mitsuharu Kaneko, Hiroshima; Keita Sasaki, Hiroshima; Kazuhisa Toh, Kure; Masayasu Nishihara, Hiroshima; Kenji Moriwaki, Hiroshima-ken, all of Japan

[73] Assignee: Mazda Motor Corporation, Hiroshima-ken, Japan

[21] Appl. No.: 4,901

[22] Filed: Jan. 21, 1993

[30] Foreign Application Priority Data

| Jan. 20, 1992 | [JP] | Japan | 4-007623 |
| Jan. 20, 1992 | [JP] | Japan | 4-007634 |
| Apr. 30, 1992 | [JP] | Japan | 4-111358 |

[51] Int. Cl.$^6$ ............................ B29C 47/00
[52] U.S. Cl. .............. 156/244.11; 156/244.24; 264/177.13; 264/178 F
[58] Field of Search ............ 156/244.11, 244.24; 525/165, 177, 425, 434, 437, 444, 466; 264/177.13, 178 F, 108; 428/294, 364

[56] References Cited

U.S. PATENT DOCUMENTS

| 4,728,698 | 3/1988 | Isayev . | |
| 5,006,403 | 4/1991 | Isayev | 264/177.13 |
| 5,043,400 | 8/1991 | Tsuruta et al. | 525/437 |
| 5,070,157 | 12/1991 | Isayev et al. | 525/444 |
| 5,204,443 | 4/1993 | Lee et al. | 528/184 |
| 5,225,488 | 7/1993 | Baird et al. | 525/132 |
| 5,395,470 | 3/1995 | Toh et al. | 156/244.11 |

FOREIGN PATENT DOCUMENTS

| 1-90255 | 4/1989 | Japan . |
| 1-158074 | 6/1989 | Japan . |
| 1-158074 | 12/1989 | Japan . |

*Primary Examiner*—Michele K. Yoder
*Attorney, Agent, or Firm*—Fish & Richardson PC

[57] ABSTRACT

The present invention relates to a method for preparing a composite material comprising a matrix resin of a thermal plastic resin and a liquid crystal resin which has a liquid crystal transition temperature higher than the minimum temperature of capable of molding said thermal plastic resin and which is formed into a fiber structure as a reinforcing material.

The method is characterized in that the composite composition is subjected to a melt extrusion process at an apparent shear rate of $3 \times 10^2$ to $10^5$ sec$^{-1}$ and above the liquid crystal transition temperature. The resulting material in a filament or thin film has fibers of the liquid crystal resin having an aspect of more than 3 in the matrix resin, so that it is provided with an improved tensile strength by further being subjected to a drawing process at a drawing ratio of 11 to 120. As the composite materials have too small diameter or thickness to be molded in a desired product, they are preferably further subjected to a gathering process, a folding process or a laminating process in which a plurality of strand or film materials are welded to each other at the surface thereof and formed into a strand or sheet form capable of molding.

10 Claims, 8 Drawing Sheets

METHOD FOR PREPARING A LIQUID CRYSTAL RESIN COMPOSITE MATERIAL AND MOLDING A PRODUCT FROM THE SAME

BACKGROUND OF THE INVENTION

1. Field of the Invention

The present invention relates to an improved method for preparing a composite resin material reinforced by a liquid crystal resin of a fiber structure dispersed in a matrix resin and molding a resin product from the composite material.

2. Description of the Prior Art

Recently, much attention has been paid to recycling fiber reinforced plastics (FRP) having a reinforcing material such as a glass fiber dispersed in a matrix resin. In place of the glass fiber, a liquid crystal resin of a fiber structure has been proposed to be mixed with a matrix resin as a reinforcing material in order to obtain a remoldable (capable of remolding) resin product having a high tensile strength (See Japanese Patent Publications (Unexamined) No.116,666/1987 and No.158,074/1989). However, the resulting resin product (hereinafter referred to as LFRP) is not sufficiently reinforced by the liquid crystal resin fiber and thus does not have improved structural strength in comparison with the conventional FRP product. For improving the physical property of the LFRP, heterogeneous reinforcing materials such as glass fibers and inorganic fillers is proposed to be added thereto (See Japanese Patent Publication (Unexamined) No.320,128/1989). However, the remoldablity (the property capable of remolding the mold product) is greatly decreased.

SUMMARY OF THE INVENTION

In view of the above disadvantages, a first object of the present invention is to provide a method for preparing the composite material without the above problem.

As a result of various experiments, there has been found that the effect of reinforcing the composite material by fiber structure of the liquid crystal resin dispersed in the matrix resin depends directly on interaction of 1) fiber formation of the liquid crystal resin dispersed in the matrix resin during the extruding process and 2) fiber drawing thereafter and the effect tends to increases with an increase in the fiber formation ratio of the liquid crystal resin during the extruding process and the drawing ratio of the liquid crystal fiber in the resulting composite material. Based on this finding, according to the present invention, there is provided a method for preparing a composite material comprising a matrix resin of a thermal plastic resin and a liquid crystal resin which has a liquid crystal transition temperature higher than the minimum moldable temperature of said thermal plastic resin and which is formed into a fiber structure as a reinforcing material, wherein said composite material is subjected to extrusion at an apparent shear rate of $3\times10^2$ to $10^5$ sec$^{-1}$ and preferably thereafter to drawing at a drawing ratio of 11 to 120.

The composite material according to the present invention may comprise any kind of thermal plastic resin such as polypropylene, polyethylene, polystyrene, ABS, polyamide (nylon), polycarbonate, polybutyrene terephthalate, polyethylene terephtalate, modified PPE (polyphenylene ether), polyphenylene sulfide, polyether sulfone, and their modification or their blends (polymer alloy).

On the other hand, the composite material according to the present invention may comprise any kind of liquid crystal resin which has a liquid crystal transition temperature higher, preferably by 20° C. or more, than the minimum moldable temperature of the matrix resin and which has no more limitation. A preferable material is a liquid crystal polyester of a thermal plastic type and a liquid crystal polyesteramide of a thermal plastic type which are commercially available as VECTRA, ECONOL and ZAIDA.

Figure 1:
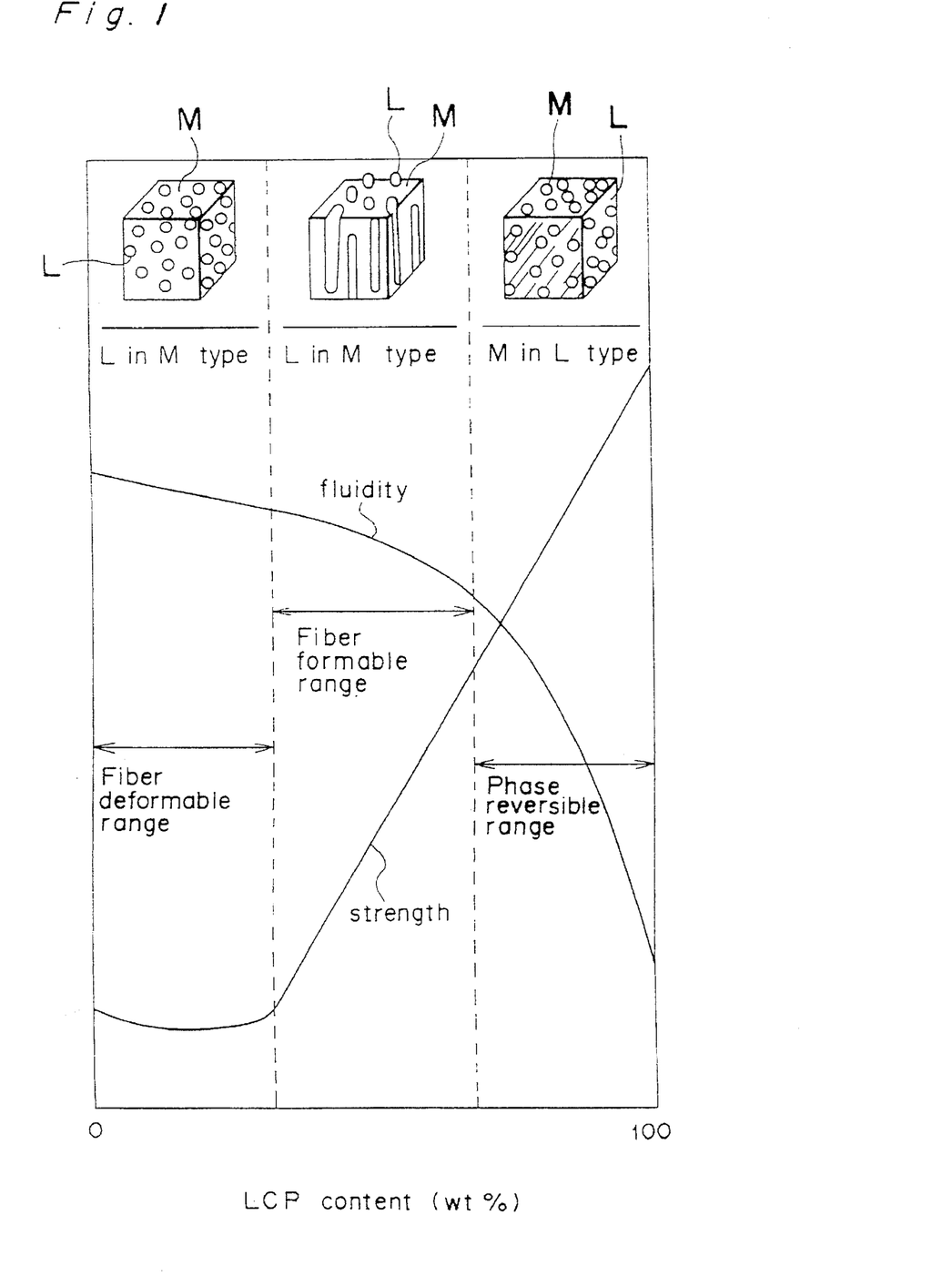
FIG. 1 is a graph showing an effect of the content of the liquid crystal resin on the state variation of the composite material.

The content of the liquid crystal resin is adjusted to be in a concentration range which accomplishes the fiber structure of the liquid crystal resin and which is less than the phase reversing concentration as shown in FIG. 1. For example, the content of the liquid crystal resin may be 40 to 80 weight % in the case of polyamide resin as a matrix resin; 30 to 75 weight % in the case of ABS (acryl butadiene styrene copolymer) as a matrix resin; 3 to 70 weight % in the case of polycarbonate (PC)/ABS as a matrix resin; 3 to 60 weight % in the case of polyphenylene oxide/nylon as a matrix resin; 2 to 70 weight % in the case of polypropylene as a matrix resin; and 3 to 70 weight % in the case of polycarbonate as a matrix resin.

When the composite material composition capable of forming a fiber structure is heated to a temperature which is higher than the minimum moldable (capable of molding) temperature of the matrix resin and is higher than the liquid crystal transition temperature, and then is extruded at that temperature, the liquid crystal resin is formed into a fiber structure in the matrix resin. The fiber structure is oriented in the extrusion direction. The extrusion process has to be carried out at an apparent shear rate against the resin of $3\times10^2$ to $10^5$ sec$^{-1}$, preferably $3\times10^2$ to $10^4$ sec$^{-1}$, more preferably $3\times10^2$ to $5\times10^3$ sec$^{-1}$. This shear rate causes the liquid crystal resin in the matrix resin to be in a fiber form with an aspect of more than 3 and thus permits the subsequent drawing process to achieve a fiber structure of the liquid crystal resin capable of improving the tensile strength. It is noted that the extruded material may be in a strand form.

The extruded strand may be subjected to the drawing process after cooling or continuously just after the extruding process. The drawing ratio (sectional area before drawing/sectional area after drawing) is preferably from more than 11 to less than 120. The drawing ratio of less than 11 does not improve the tensile strength and the drawing ratio of more than 120 does not increase the tensile strength.

Figure 2:
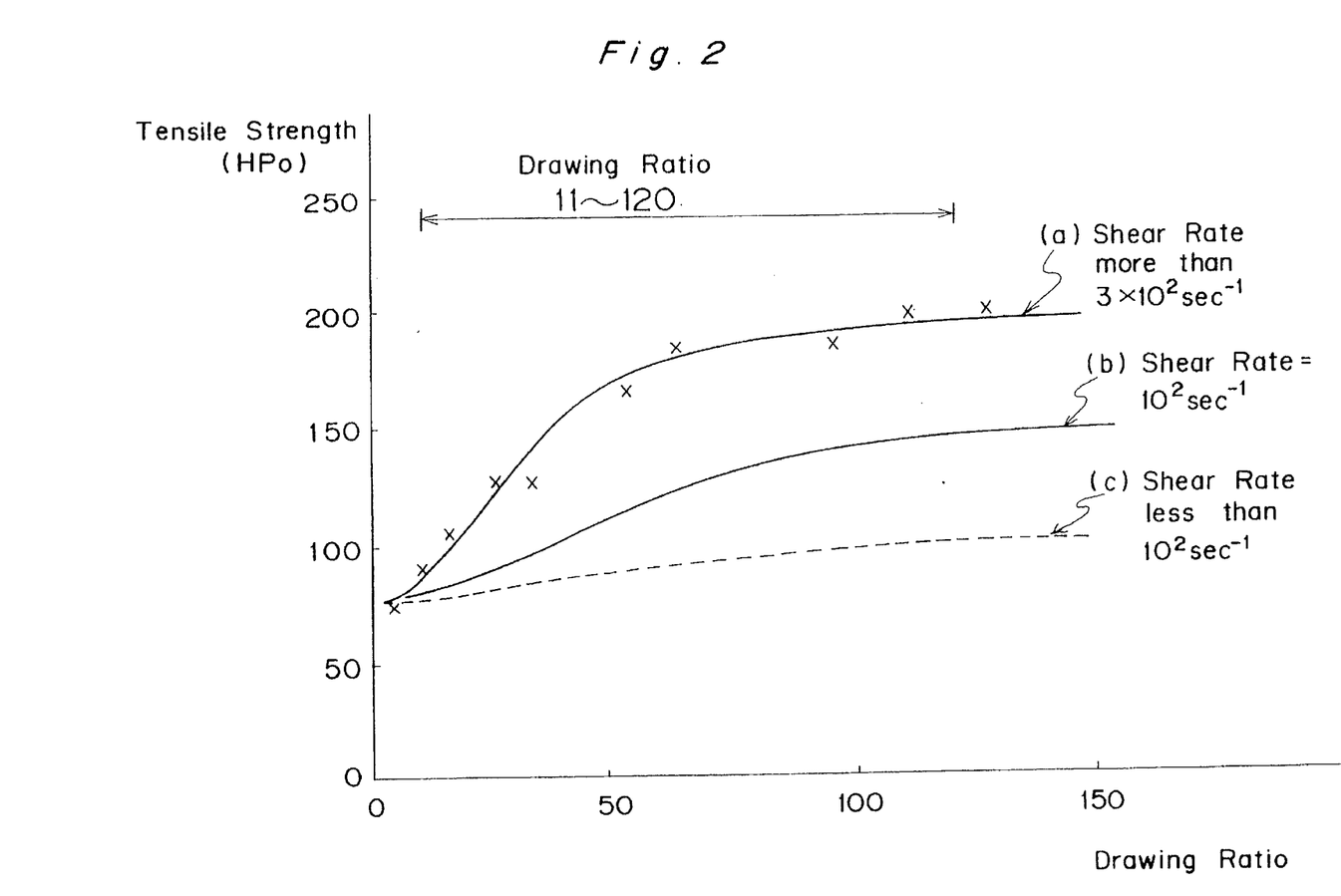
FIG. 2 is a graph showing an interaction between the apparent shear rate and the drawing ratio in the respect of the tensile strength.

FIG. 2 shows the relationship between the apparent shear rate and the drawing ratio. That is, the liquid crystal resin in the matrix resin, which is subjected to extrusion treatment at the apparent shear rate of $3\times10^2$ to $10^5$ sec$^{-1}$, tends to have a sufficient effect for improving the tensile strength caused by the drawing action under the drawing ratio of 11 to 120 and shows an remarkably increased value of the tensile strength. On the other hand, the liquid crystal resin extruded under the apparent shear rate of $10^2$sec$^{-1}$ or less tends not to increase the effect of improving the tensile strength(HPa) caused by the drawing action. Accordingly, the present invention provides a highly reinforced composite material to be molded in the field of remoldable LFRP(liquid crystal resin fiber reinforced plastics).

In many cases, the extruded and drawn material of a film or strand form is too small in diameter or thickness to be molded into a desired product. Therefore, the resulting extruded and drawn composite in the filament or thin film may be integrated to each other by gathering, folding or laminating in order to be used as a starting material for a mold product, while they may sometimes be used as a final product as it is.

Therefore, in another aspect of the present invention, there are provided the following methods for preparing a composite material suitable to molding. That is, 1) in the case that the resulting materials are in a filament form, they are further subjected to a gathering process in which a plurality of filament materials are welded to each other at the surface thereof and formed into a strand form at a welding temperature range from more than the minimum moldable temperature (the minimum temperature of capable molding) to less than the liquid crystal transition temperature. The resulting strand for the filament winding process must have a diameter of more than 0.3 mm and that for another molding product must have a diameter of more than 1 mm.

2) In the case that the resulting materials are in a thin film form, they are further subjected to a folding process in which each film material is folded and welded to each other at the overlapped surface thereof and formed into a strand form at a welding temperature range from more than the minimum moldable temperature to less than the liquid crystal transition temperature.

3) In the case that the resulting materials are in a thin film, they are further subjected to a laminating process in which a plurality of film materials are welded to each other at the surface thereof and formed into a sheet form at a welding temperature range from more than the minimum moldable temperature to less than the liquid crystal transition temperature. The laminating process may be carried out in succession of the extruding process. Preferably, after the extruding process, the resulting film is cooled below the minimum temperature of capable of molding the matrix resin and then is heated to the welding temperature of the matrix resin, under which temperature the resulting films are laminated. The film materials are anisotropic ones in which the liquid crystal resin fibers are oriented in an extruded direction. Therefore, they are laminated in a manner that the fiber oriented direction are crossed at an angle of 90→° more or less in order to obtain an isotropic material.

In a further aspect of the present invention, there are provided the following arrangements for carrying out the above methods. That is, 1) in the case of preparing a composite material in a strand form from filament materials, the arrangement may comprises;

a means for melt-extruding a mixture of a matrix resin of a thermal plastic resin and a liquid crystal resin which has a liquid crystal transition temperature higher than the minimum temperature of capable of molding said thermal plastic resin, at an apparent shear rate of $3 \times 10^2$ to $10^5$ $\sec^{-1}$ and above the liquid crystal transition temperature, into a filament form;

a means for drawing at a drawing ratio of 11 to 120 the extruded composite materials in the filament form comprising fibers of the liquid crystal resin having an aspect of more than 3 in the matrix resin;

a means for gathering the resulting filament materials into a strand form, in which a plurality of filament materials are welded to each other at the surface thereof and formed into a strand form at a welding temperature range from more than the minimum moldable temperature to less than the liquid crystal transition temperature.

2) In the case of preparing a composite material in a strand form from a thin film, the arrangement may comprise;

a means for melt-extruding mixture of a matrix resin of a thermal plastic resin and a liquid crystal resin which has a liquid crystal transition temperature higher than the minimum temperature capable of molding said thermal plastic resin into a thin film form, at an apparent shear rate of $3 \times 10^2$ to $10^5$ $\sec^{-1}$ and above the liquid crystal transition temperature into a film form;

a means for drawing at a drawing ratio of 11 to 120 the extruded composite materials in the film form comprising fibers of the liquid crystal resin having an aspect of more than 3 in the matrix resin;

a means for folding the resulting film into a strand in which each film material is welded to each other at the overlapped surface thereof and formed into a strand form at a welding temperature range from more than the minimum moldable temperature to less than the liquid crystal transition temperature.

3) In the case of preparing a composite material in a sheet form from the film materials, the arrangement may comprise;

a means for melt-extruding mixture of a matrix resin of a thermal plastic resin and a liquid crystal resin which has a liquid crystal transition temperature higher than the minimum temperature capable of molding said thermal plastic resin, at an apparent shear rate of $3 \times 10^2$ to $10^5$ $\sec^{-1}$ and above the liquid crystal transition temperature, into a film form;

a means for drawing at a drawing ratio of 11 to 120 the extruded composite materials comprising fibers of the liquid crystal resin having an aspect of more than 3 in the matrix resin;

a means for laminating the resulting film into a sheet in which a plurality of film materials are welded to each other at the overlapped surface thereof and formed into a sheet form at a welding temperature range from more than the minimum moldable temperature to less than the liquid crystal transition temperatures. In the arrangement, the means for laminating the resulting film into a sheet may comprise at least one pair of pressing rolls. At least one of the rolls is preferably provided with a heating device for heating the materials to be laminated and an adjusting device for space between the pair rolls in order to draw the materials to be laminated during welding.

All the above arrangements, may further comprise a means for cutting the composite material in the strand or sheet form into a desired size.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

EXAMPLE 1

The used matrix resin is PC/ABS (TECHNIACE 105 made by SUMITOMO NORGATAC Co.,Ltd.). The used liquid crystal resin is aromatic polyester (VECTRA A950 made by POLYPLASTIC Co., Ltd.; melting point (liquid crystal transition temperature); 280° C.). The composite material is prepared from a mixture of 80 weight % of PC/ABS and 20 weight % of the aromatic polyester and then extruded into a strand form with a biaxial extruder (type ST-30-S2-36L made by PLASTIC TECHNOLOGY RESEARCH Co.,Ltd.) at the following extrusion condition: screw diameter, 30 mm; resin temperature, 290° C.; screw rotation number, 100 rpm; and shear rate, 1700 sec$^{-1}$. The extruded material is further drawn with a drawing machine made by the inventor's company. In the drawing process, the drawing ratio is set to a varied value from 10 to 130 and the tensile strength is measured. The results are shown in FIG. 2. On the other hand, variation of the drawing ratio at the apparent shear rate of less than $10^2$ sec$^{-1}$ scarcely cause the tensile strength to change.

EXAMPLE 2

The same process as the Example 1 is carried out except use of modified PPO (NORYL SE90 made by JAPAN G.E. PLASTICS Co., Ltd.) and the same results as the Example 1 are obtained.

EMBODIMENT 1

FIGS. 3 to 7 show the arrangement for preparing a composite material in a strand form by extruding multiple filaments at the same time and gathering them into a strand form.

The arrangement comprises an extruder 1, a gathering device 2 and a drawing device 3. The extruder 1 is provided with an extruding nozzle 12, at the tip of which a multi-hole die 12 having 5 holes is mounted on a body (not shown) through a outer circular portion 13 with screws 14. In the die 12, a center hole 12a having a diameter of 2 mm is enclosed with 4 outer holes 12b–12e having the same diameter as that of the center hole and the 5 holes are directed in a manner to gather toward the center hole at a determined forward position, so that the filaments F extruded from the holes of the die are capable of gathering at the inlet of the gathering device. The gathering device 2 comprises a pair of guide members 21 arranged just in front of the inlet and a pair of hourglass-like rollers 22 provided with two large diameter parts 22a at the both side thereof and one small diameter part 22b between the parts 22a, which small diameter part act to press the filaments F in a radius direction and integrate them in a single strand S. The filaments F may be twisted together at the time of gathering.

Figure 3:
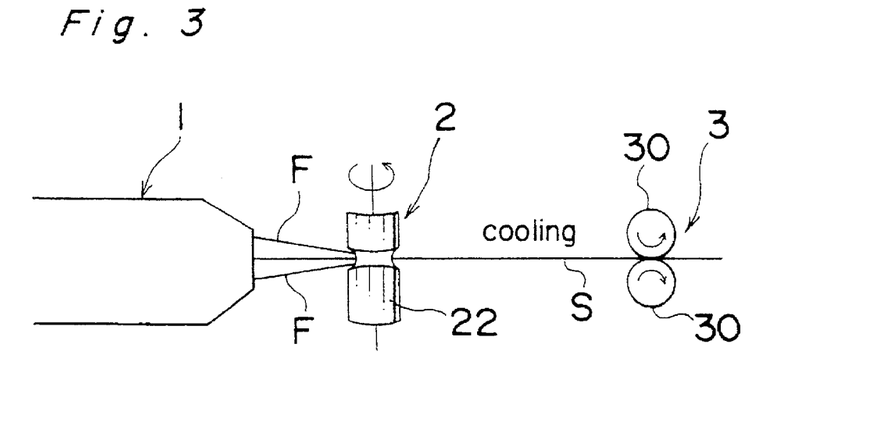
FIG. 3 is a schematic side view of the first embodiment according to the present invention.
Figure 4:
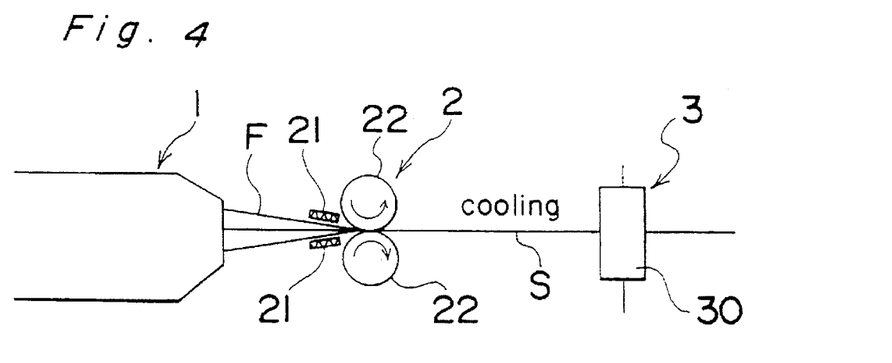
FIG. 4 is a schematic plane view of FIG. 3.
Figure 5:
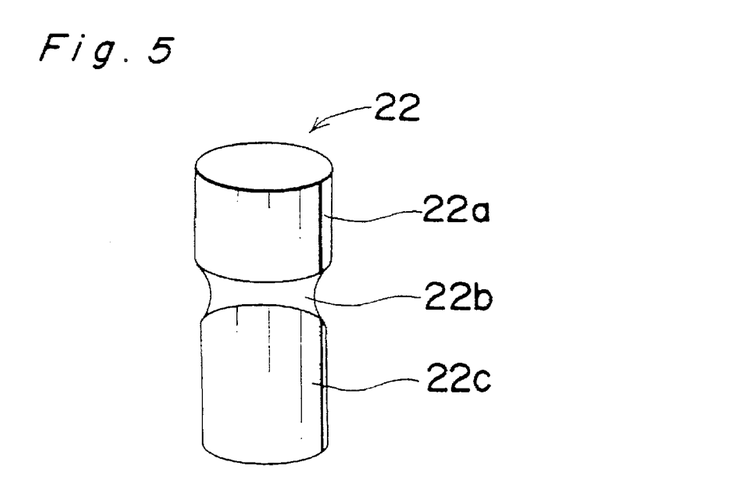
FIG. 5 is a perspective view of a roll for gathering the filaments in the first embodiment of FIGS. 3 and 4.
Figure 6:
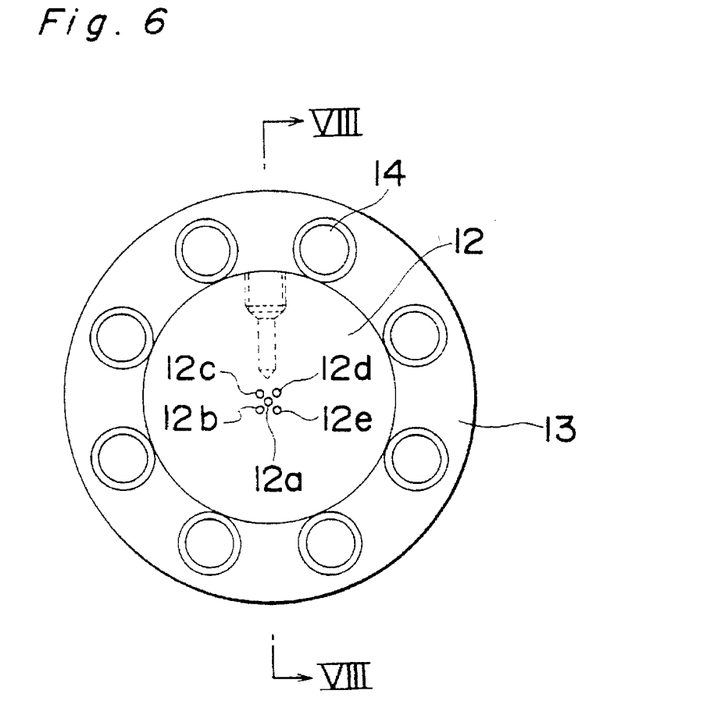
FIG. 6 is an end view of a multi-hole die used in the first embodiment.
Figure 7:
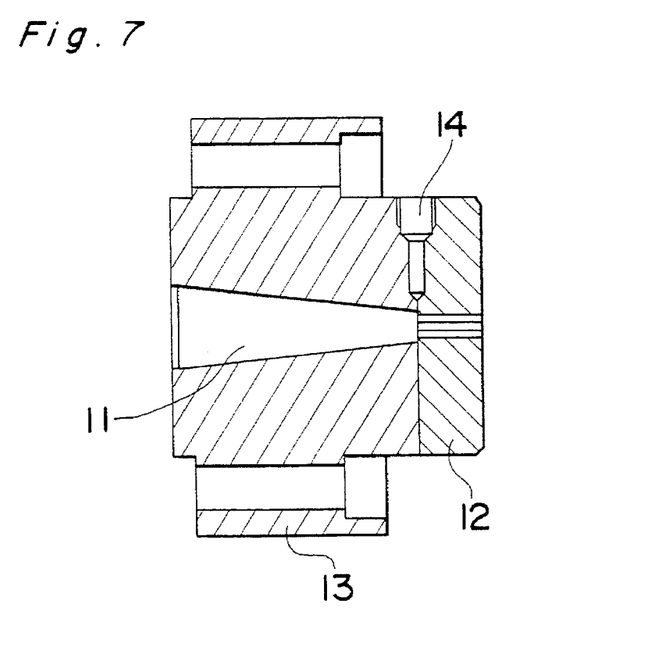
FIG. 7 is a sectional view along VII—VII line of FIG. 6.

When the gathered filaments comes to the drawing device 3, they are subjected to the drawing treatment. The drawing device 3 comprises a pair of drawing rollers 30 which rotate in an opposite direction to each other, thereby the strand S is pulled in the longitudinal direction thereof by means of the tensile power caused by the drawing rollers.

EMBODIMENT 2

Figure 8:
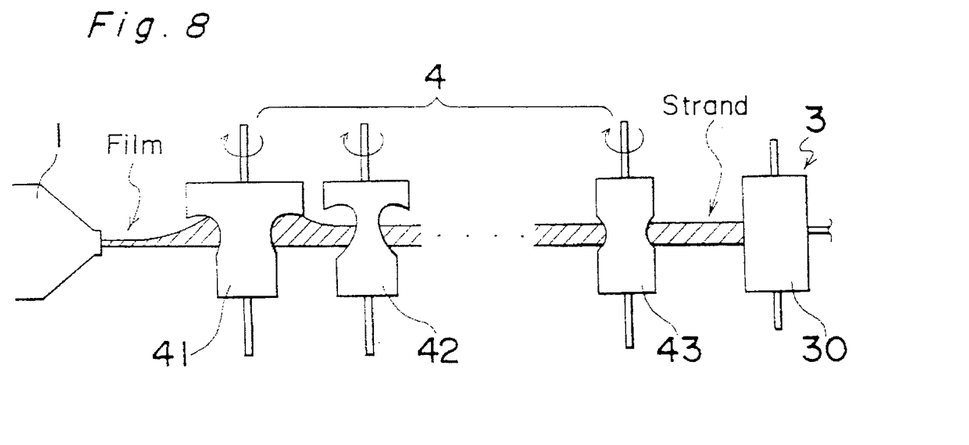
FIG. 8 is a schematic side view of the second embodiment according to the present invention.
Figure 9:
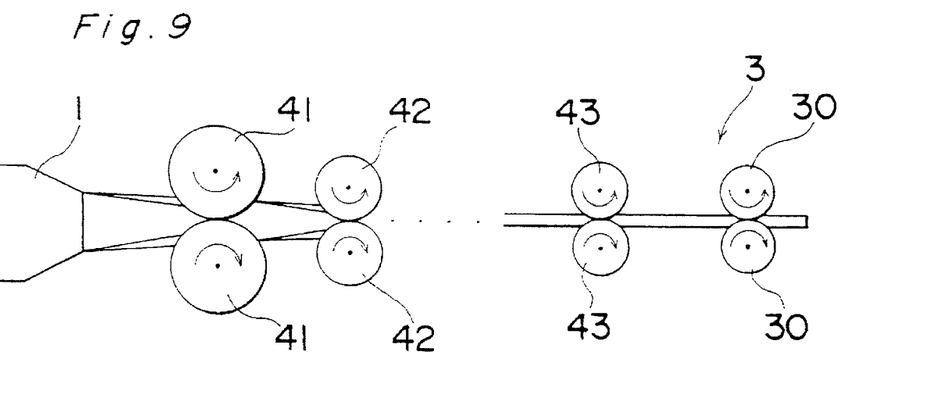
FIG. 9 is a schematic plane view of FIG. 8.
Figure 10:
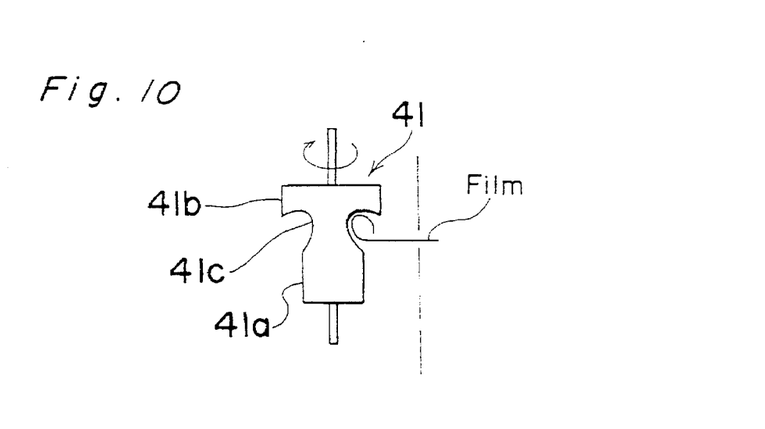
FIG. 10 is a perspective view of rolls for folding the film used in the second embodiment.

FIGS. 8 and 9 show the second embodiment, which comprises a film extruder 10, a folding device 4 and a film drawing device 30. The film extruder 10 is provided with a normal film extruding die and the folding device 4 comprises plural pairs of rolls 41 and 42 for rounding the film in the transverse direction and a pair of rolls 43 for pressing and welding the rounded film. The rounding rolls 41 and 42 are provided with a rounding formation part 41c formed curvedly in an outward direction from a smaller body 41a to a larger body 41b, thereby the film abuts at the both side to the rounding formation part 41c to be folded toward inside thereof from the both side along the curved surface of the rounding formation part 41c. The curvature of the curved surface is designed to decrease from the inlet to the outlet of the folding device, that is, as the film goes toward the front. Therefore, the film comes to be folded gradually toward inside by means of the array of the curved surface, resulting in formation of two rounded parts which is finally pressed by a pair of pressing rolls 43, 43 to form a strand S. When the strand comes to the drawing device 3, they are subjected to the drawing treatment similarly as the first embodiment and the cutting process for cutting the strand into a desired size.

EXAMPLE 3

The used matrix resin is PC/ABS (TECHNIACE A105 made by SUMITOMO NORGATAC Co.,Ltd.). The used liquid crystal resin is aromatic polyester (BECTRA A950 made by POLYPLASTIC Co., Ltd.; melting point (liquid crystal transition temperature); 280° C.). The composite material is prepared from a mixture of 80 weight % of PC/ABS and 20 weight % of the aromatic polyester and then extruded into a strand form with a biaxial extruder provided with multi-hole die as shown FIG. 6 (type ST-30-S2-36L made by PLASTIC TECHNOLOGY RESEARCH Co.,Ltd.) at the following extrusion condition: screw diameter, 30 mm; resin temperature, 290° C.; screw rotation number, 100 rpm; and shear rate, 1700 sec$^{-1}$. The 5 extruded filaments having a diameter of 0.2 mm are subjected to the gathering device in FIGS. 3 and 4 to obtain a molding strand material having a diameter of 1 mm and further drawn with an drawing machine made by the inventor's company. The molding strand composite is cut into a pellet material of 3 mm in length.

The pelett is molded into a composite product in the injection machine (220 ton., made by TOSHIBA MACHINE Co.,Ltd.) provided with a test-piece type die under the condition; resin temperature 220° C., injection pressure 1000 kg/cm2.

EMBODIMENT 3

Figure 11:
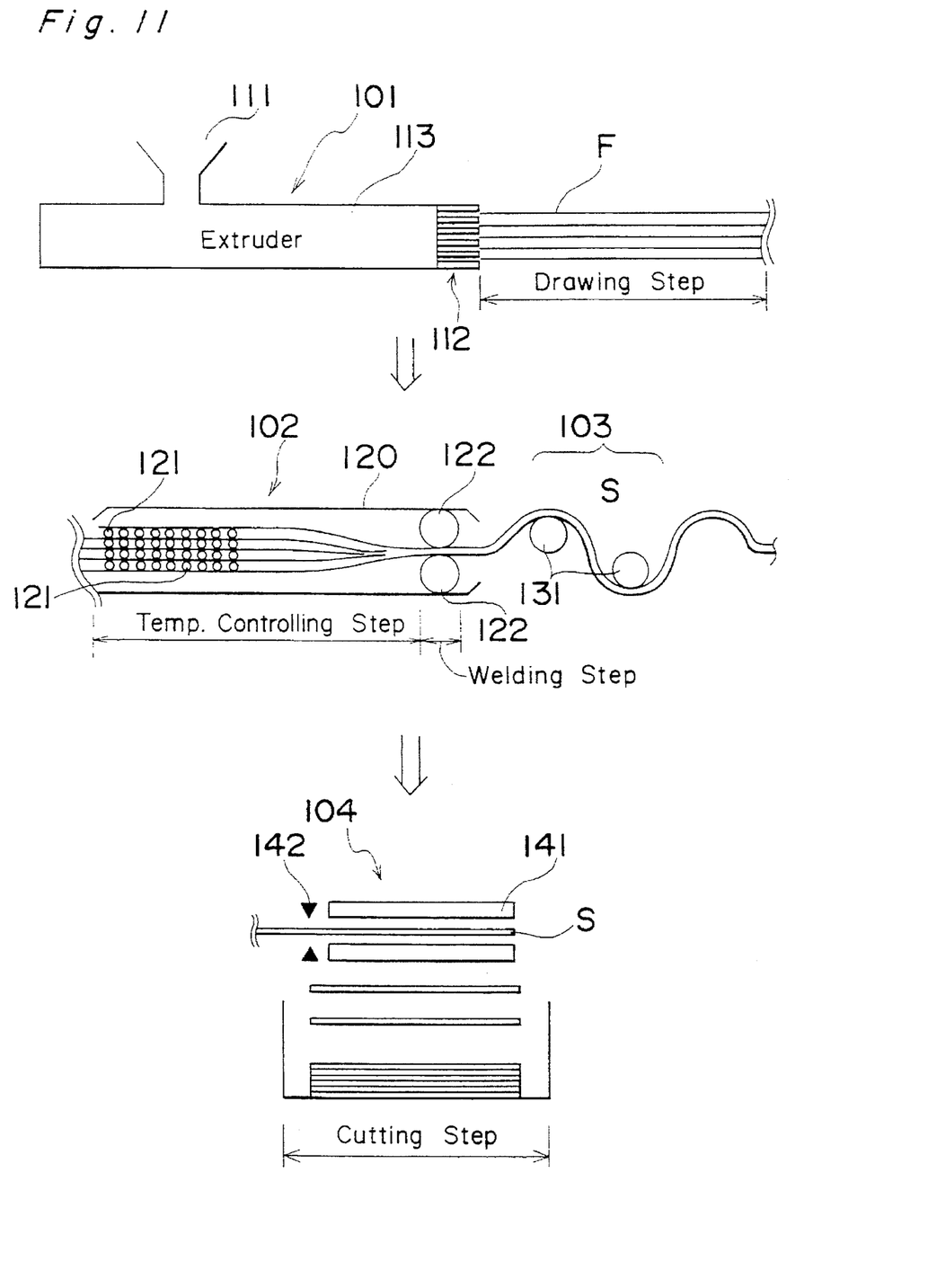
FIG. 11 is a schematic view showing the process for a sheet-like composite material of the third embodiment according to the present invention.

FIG. 11 shows the arrangement for preparing a sheet-like composite material according to the present invention, which comprises a film extruder 101 provided with an inlet 111, a nozzle die 112 and a furnace 113, in which mixture of a thermoplastic matrix resin tip and a thermoplastic liquid crystal resin is charged into the furnace 113 and the melt mixture is extruded from the nozzle die 112 at an apparent shear rate of $3 \times 10^2$ to $10^5$ sec$^{-1}$ to form film-like composite materials. The resulting film material has a thickness of 0.1 to 0.2 mm and includes the liquid crystal resin fibers having an aspect of more than 3 are oriented in the extrusion direction and dispersed in the matrix resin.

102 denotes a device for laminating the film materials after drawing and controlled to a welding temperature, which comprises a case 120 enclosing a part of the running passage for a plurality of the film materials, in which each pair of small diameter rollers 121, capable of controlling the surface temperature, are arranged in a row at a right angle to the running passage and each pair rollers are arranged in the up-and-down direction to form a temperature controlling zone, which is followed by a pair of pressing rolls 122, 122 oppositely arranged in a predetermined space therebetween. Therefore, when the film materials pass between the small rollers 121, 121 in the temperature controlling zone and are heated and adjusted to a predetermined welding temperature, that is, the range from the minimum moldable temperature to the liquid crystal transition temperature, they gather to each other in an overlapped manner and enter between the pressing rollers 122 to be pressed. The pressing treatment make the overlapped film materials to be drawn and to be adhered in a manner that the contact surfaces of the film materials are welded without any air therebetween. Further, there may be provided with a cooling means for blowing a cooling air at a right angle to the extruding direction between the film materials. While the film materials are controlled to a predetermined welding temperature at the surface, the surface temperature of the pressing rolls 122 is preferably capable of controlled to the welding temperature and set to the higher range than that of the temperature controlling rollers 121.

103 denotes a rolling apparatus for preventing the welded sheet-like material from having a sagging between the film materials,, which comprises rollers arranged in a zigzag manner, between which the welded sheet-like material pass to remove the sagging. Thereafter, the composite sheet material is cut into a desired size by means of a cutting device 104, which comprises a pair of pressing plates 141, 141 having an area capable of covering a predetermined size and cutter means 142 arranged just in front of the pressing plate to press the composite sheet material and cut it into the predetermined size.

Figure 12:
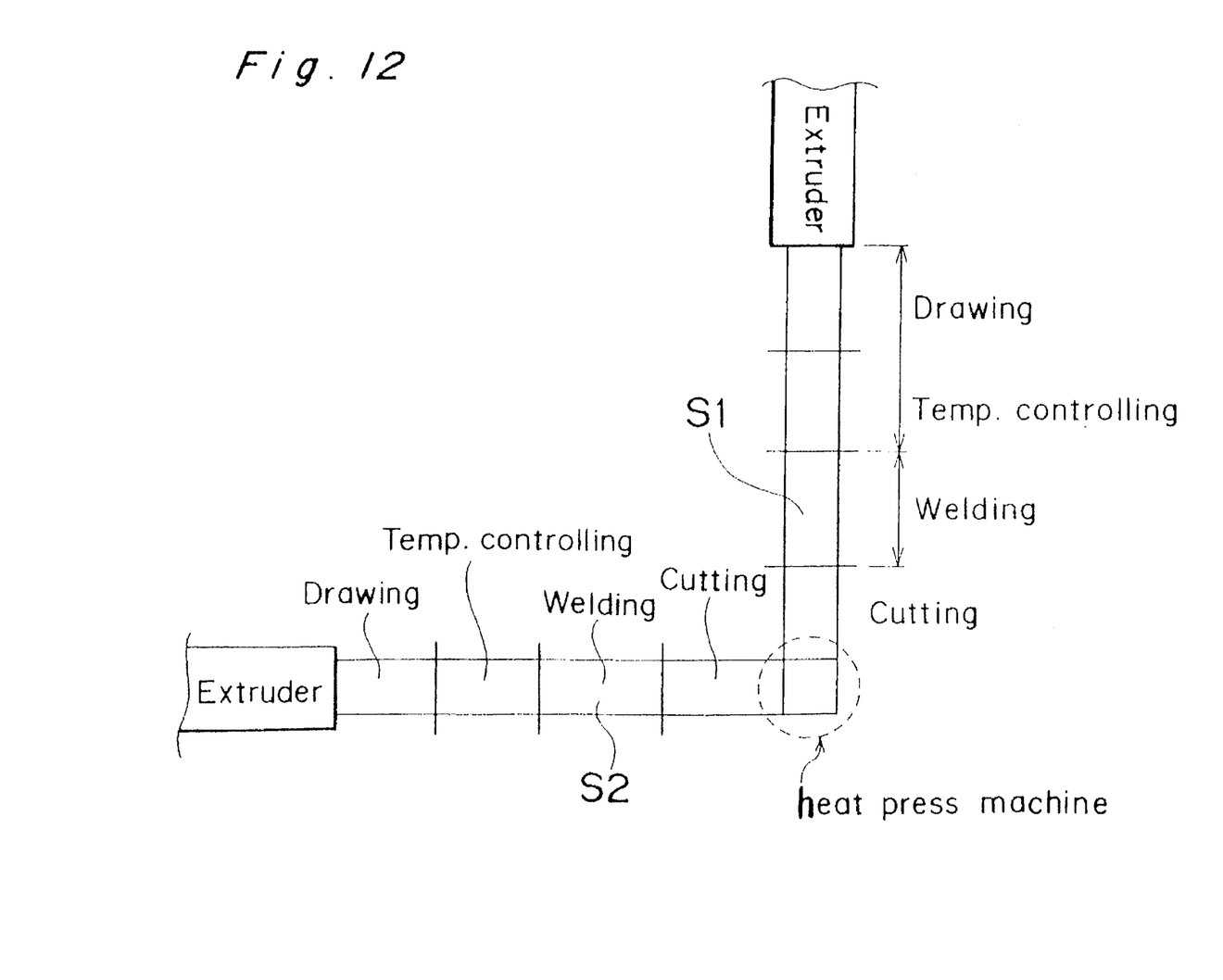
FIG. 12 is an arrangement view of an alternative third embodiment according to the present invention.
Figure 13:
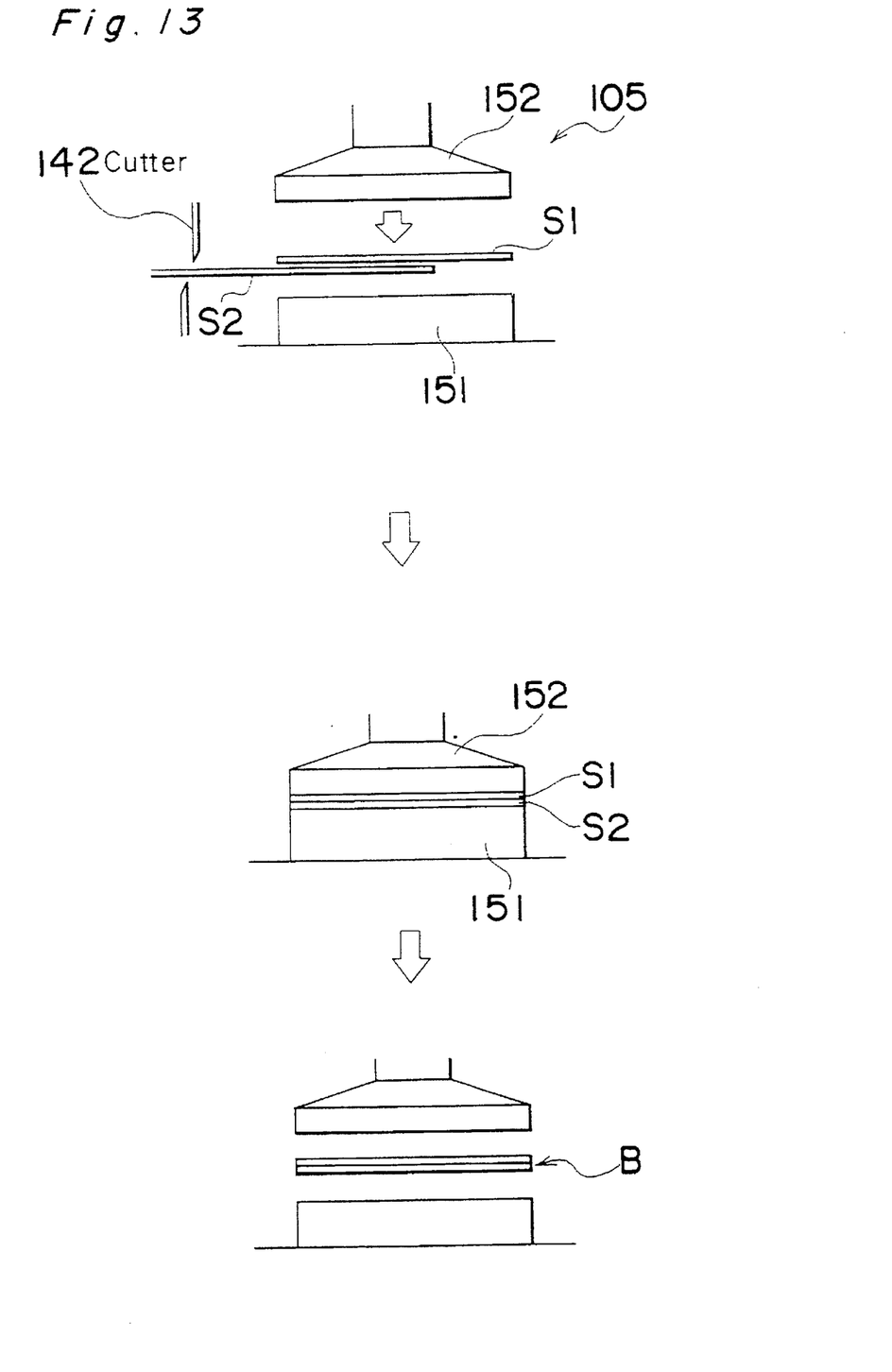
FIG. 13 is an operation explanatory view of a heat pressing device used in FIG. 12.

FIGS. 12 and 13 show an another arrangement for laminating the film materials in a manner that the liquid crystal fiber oriented in the extruded direction comes to be crossed to each other, which comprises an extruder, a drawing means, a temperature controlling means, a welding means and a cutting means arranged in a file and in a row and a heat pressing device 105 positioned at the cross point. The heat pressing device 105 comprises a base plate 151 near a cutting device 142 and a heat pressing plate 152 capable of moving up and down in a vertical line above the base plate 151 to press the sheet materials overlapped in a crossed manner and then welded to each other at the contact surface to form a sheet-like blank material in which the liquid crystal fibers thereof are directed at a right angle to each other.

The crossed angle of the film materials to be welded can be controlled within a range from 0° to 90°. When the laminated film materials have various angles of −45°, 0°, +45° and 90°, the resulting blank material becomes to have a pseudo isotropic property. Therefore, the blank material is capable of used as the isotropic material such as a material for floor panel and outer panel. On the other hand, the blank material having liquid crystal fiber oriented in the one direction is useful to a material for bumper reinforcement and leaf spring.

EXAMPLE 4

The used matrix resin is PA6 (UBENYLON 1030B made by UBE KOSAN Co.,Ltd.). The used liquid crystal resin is aromatic polyester (VECTRA A950 made by POLYPLASTIC Co., Ltd.; melting point (liquid crystal transition temperature); 280° C.). The composite material is prepared from a mixture of 40 weight % of PA6 and 60 weight % of the aromatic polyester and then extruded into a film form with a biaxial extruder provided with multi-film die as shown FIG. 11 (type ST-30-S2-36L made by PLASTIC TECHNOLOGY RESEARCH Co.,Ltd.) at the following extrusion condition: screw diameter, 30 mm; resin temperature, 290° C.; screw rotation number, 75 rpm; die size, 2 mm; and shear rate, 1700 sec$^{-1}$. The extruded films having a thickness of 0.1 to 0.2 mm are subjected to the laminating device provided with a pair of heat pressing rollers (Surface Temp. 260° C. and space between rollers 5 to 10 mm) in FIGS. 11 to obtain a laminated sheet material having a thickness of 5–10 mm. The sheet material is subjected to a Tensile Strength measuring test and it is confirmed that the material has properties necessary for composite reinforced by fibers of the liquid crystal resin.

EXAMPLE 5

The film materials prepared in the Example 4 and film materials (thickness of 0.01–0.1 mm) without the liquid crystal resin, made of PA 6 resin as above or made of maleic acid modified polypropylene (ADOMER made by MITUI PETROLUM CHEMICAL Co., Ltd.) are laminated alternatively to form a blank sheet material having a thickness of 5–10 mm by the similar procedure as Example 4. The resulting sheet material is subjected to a Tensile Strength measuring test and compared with that of Example 4. It is confirmed that both materials have properties necessary for composite reinforced by fibers of the liquid crystal resin, but the welding temperature of PA 6 resin is lower than that of the other case.

EXAMPLE 6

The used matrix resin is PA6 (UBENYLON 1030B made by UBE KOSAN Co.,Ltd.). The used liquid crystal resin is aromatic polyester (BECTRA A950 made by POLYPLASTIC Co., Ltd.; melting point (liquid crystal transition temperature); 280° C.). The composite material is prepared from a mixture of 30 weight % of PA6 and 70 weight % of aromatic polyester and then extruded into a film form with a biaxial extruder provided with multi-film die as shown FIG. 11 (type ST-30-S2-36L made by PLASTIC TECHNOLOGY RESEARCH Co.,Ltd.) at the following extrusion condition: screw diameter, 30 mm; resin temperature, 290° C.; screw rotation number, 75 rpm; die size, 2 mm; and shear rate, 1700 sec$^{-1}$. The extruded films having a thickness of 0.1 to 0.2 mm are subjected to the laminating device provided with a pair of heat pressing rollers (Surface Temp. 260° C. and space between rollers 5 to 10 mm) in FIGS. 11 to obtain a laminated sheet material having a thickness of 5–10 mm and oriented fibers of the liquid crystal resin.

On the other hand, another composite material is prepared from a mixture of 20 weight % of PA6 and 80 weight % of aromatic polyester and then extruded into a film form, which is cut to a pierce of about 25 mm in length and laminated to each other to form a random sheet material.

The random sheet material and a pair of the fiber oriented sheet materials overlapped at the opposite sides are heat pressed at a suitable temperature more than the minimum moldable temperature of the matrix resin and less than the liquid crystal transition temperature to give a composite panel.

EXAMPLE 7

The used matrix resin is PA6 (UBENYLON 1030B made by UBE KOSAN Co.,Ltd.). The used liquid crystal resin is aromatic polyester (VECTRA A950 made by POLYPLASTIC Co., Ltd.; melting point (liquid crystal transition temperature); 280° C.). The composite material is prepared from a mixture of 30 weight % of PA6 and 70 weight % of aromatic polyester and then extruded into a film form with a biaxial extruder provided with multi-film die as shown FIG. 11 (type ST-30-S2-36L made by PLASTIC TECHNOLOGY RESEARCH Co.,Ltd.) at the following extrusion condition: screw diameter, 30 mm; resin temperature, 290° C.; screw rotation number, 75 rpm; die size, 2 mm; and shear rate, 1700 sec$^{-1}$. The extruded films having a thickness of 0.1 to 0.2 mm are crossed at various angles of −45°, 0°, +45° and 90°, and subjected to the laminating device provided with a pair of heat pressing rollers (Surface Temp. 260° C. and space between rollers 5 to 10 mm) in FIGS. 11 to obtain a laminated sheet material having a thickness of 5–10 mm and a pseudo isotropic property.

On the other hand, another composite material is prepared from a mixture of 20 weight % of PA6 and 80 weight % of aromatic polyester and then extruded into a film form, which is cut to a pierce of about 25 mm in length and laminated to each other to form a random sheet material.

The random sheet material and a pair of the isotropic sheet materials overlapped at the opposite sides are heat pressed in a similar manner as Example 6 to give a composite panel.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for preparing a composite material comprising preparing a composition of a matrix resin of a non-liquid crystal thermoplastic resin and a liquid crystal resin which has a liquid crystal transition temperature higher than the minimum molding temperature of said thermoplastic resin and which is formed into a fiber structure as a reinforcing material and melt extruding the composition at a shear rate of $3 \times 10^2$ to $10^5$ sec$^{-1}$ and above the liquid crystal transition temperature to form fibers of the liquid crystal resin having an aspect ratio of more than 3 in the matrix resin.

2. The method for preparing a composite material according to claim 1, further comprising drawing at a drawing ratio of 11 to 120 after the extruding step.

3. The method for preparing a composite material according to claim 1 or 2, wherein the resulting materials are in a filament form, and which further comprises a gathering step in which a plurality of filament materials are welded to each other at the surface thereof and formed into a strand form at a welding temperature range from more than the minimum moldable temperature to less than the liquid crystal transition temperature.

4. The method for preparing a composite resin according to claim 1 wherein the shear rate is from $3 \times 10^2$ to $10^4$ sec$^{-1}$.

5. The method for preparing a composite material according to claim 1 wherein the shear rate is from $3 \times 10^2$ to $10^3$ sec$^{-1}$.

6. A method for preparing a composite material comprising preparing a composition of a matrix resin of a non-liquid crystal thermoplastic resin and a liquid crystal resin which has a liquid crystal transition temperature higher than the minimum molding temperature of said thermoplastic resin and which is formed into a fiber structure as a reinforcing material and melt extruding the composition at a shear rate of $3 \times 10^2$ to $10^5$ sec$^{-1}$ and a temperature above the liquid crystal transition temperature to form fibers of the liquid crystal resin.

7. The method for preparing a composite material according to claim 6, further comprising drawing at a drawing ratio of 11 to 120 after the extruding step.

8. The method for preparing a composite material according to claim 6 or 7, wherein the resulting materials are in a filament form, and which further comprises a gathering step in which a plurality of filament materials are welded to each other at the surface thereof and formed into a strand form at a welding temperature range from more than the minimum moldable temperature to less than the liquid crystal transition temperature.

9. The method for preparing a composite resin according to claim 6 wherein the shear rate is from $3 \times 10^2$ to $10^4$ sec$^{-1}$.

10. The method for preparing a composite material according to claim 6 wherein the shear rate is from $3 \times 10^2$ to $10^3$ sec$^{-1}$.

* * * * *